US012644398B2

(12) United States Patent　　　(10) Patent No.:　US 12,644,398 B2

Hirose　　　　　　　　　　　　　　(45) Date of Patent:　　Jun. 2, 2026

(54) INTERNAL COMBUSTION ENGINE

(71) Applicant: TOYOTA JIDOSHA KABUSHIKI KAISHA, Toyota (JP)

(72) Inventor: Hidetoshi Hirose, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/921,000

(22) Filed: Oct. 21, 2024

(65) Prior Publication Data

US 2025/0243791 A1　　Jul. 31, 2025

(30) Foreign Application Priority Data

Jan. 26, 2024　(JP) ................................. 2024-010253

(51) Int. Cl.
　　*F01L 1/02*　　　　(2006.01)
　　*F16H 7/08*　　　　(2006.01)
　　*F16H 7/18*　　　　(2006.01)
(52) U.S. Cl.
　　CPC ................ *F01L 1/022* (2013.01); *F16H 7/18* (2013.01); *F16H 2007/0842* (2013.01)
(58) Field of Classification Search
　　CPC ............... F16H 7/08; F16H 2007/0842; F16H 2007/0812; F16H 7/18; F01L 1/022
See application file for complete search history.

(56) References Cited

U.S. PATENT DOCUMENTS

| | | | | |
|---|---|---|---|---|
| 4,553,509 A | * | 11/1985 | Mezger | F02B 75/22 123/192.1 |
| 4,869,708 A | * | 9/1989 | Hoffmann | F16H 7/18 474/140 |
| 4,957,077 A | * | 9/1990 | Okitsu | F01L 1/024 123/90.31 |
| 5,010,859 A | * | 4/1991 | Ogami | F02F 7/0068 123/90.31 |
| 5,033,421 A | * | 7/1991 | Shimada | F16H 7/18 123/90.31 |
| 5,148,784 A | * | 9/1992 | Hiraoka | F01M 11/00 123/41.01 |
| 5,216,984 A | * | 6/1993 | Shimano | F01L 1/02 123/198 C |
| 5,351,663 A | * | 10/1994 | Makimura | F02B 75/22 123/90.31 |
| 5,366,418 A | * | 11/1994 | Fukushima | F16H 7/08 123/90.31 |
| 5,425,680 A | * | 6/1995 | Young | F01L 1/02 474/111 |

(Continued)

FOREIGN PATENT DOCUMENTS

JP　　　　H08-156640 A　　　6/1996

*Primary Examiner* — Henry Y Liu
(74) *Attorney, Agent, or Firm* — SoraIP, Inc.

(57)　　　　　　ABSTRACT

An internal combustion engine includes a plurality of chains that are arranged axially adjacent to each other with respect to a crankshaft protruding from an internal combustion engine body, and are each distributed with power from the crankshaft, a chain tensioner that applies tension to the chain, a chain guide that guides the chain, and a bracket that is attached to the internal combustion engine body so as to straddle at least one of the plurality of chains, and at least one of the chain tensioner and the chain guide is attached to the bracket.

5 Claims, 5 Drawing Sheets

(56)                  References Cited

U.S. PATENT DOCUMENTS

| | | | | |
|---|---|---|---|---|
| 5,427,582 A * | 6/1995 | Iwao | F16H 7/06 | 474/111 |
| 5,662,540 A * | 9/1997 | Schnuepke | F16H 7/08 | 474/140 |
| 5,665,019 A * | 9/1997 | Sheffer | F16H 7/18 | 474/140 |
| 5,730,673 A * | 3/1998 | Schnupke | F16H 7/08 | 474/111 |
| 5,846,150 A * | 12/1998 | Wigsten | F16H 7/18 | 474/140 |
| 6,238,311 B1 * | 5/2001 | Cutting | F16H 7/08 | 474/140 |
| 6,322,469 B1 * | 11/2001 | Markley | F16H 7/1236 | 474/111 |
| 6,378,478 B1 * | 4/2002 | Lagies | F01L 1/022 | 123/90.31 |
| 6,412,464 B1 * | 7/2002 | Schneider | F02B 75/22 | 123/90.31 |
| 6,619,253 B2 * | 9/2003 | Kobayashi | F01L 1/022 | 123/195 C |
| 6,620,067 B1 * | 9/2003 | Nakamura | F01L 1/024 | 474/140 |
| 6,623,391 B2 * | 9/2003 | Young | F16H 7/08 | 474/140 |
| 6,766,714 B2 * | 7/2004 | Iwata | F16J 15/14 | 74/606 R |
| 6,849,015 B2 * | 2/2005 | Markley | F16H 7/0848 | 474/140 |
| 6,923,154 B2 * | 8/2005 | Gschwindt | F02F 7/0073 | 123/195 C |
| 6,955,622 B2 * | 10/2005 | Bachmair | F01L 1/46 | 474/140 |
| 7,017,545 B2 * | 3/2006 | Sato | F16F 15/265 | 123/192.2 |
| 7,097,579 B2 * | 8/2006 | Markley | F16H 7/18 | 474/140 |
| 7,390,276 B2 * | 6/2008 | Tryphonos | F01L 1/024 | 474/140 |
| 7,455,606 B2 * | 11/2008 | Markley | F16H 7/0848 | 474/111 |
| 7,476,168 B2 * | 1/2009 | Markley | F16H 7/18 | 474/111 |
| 7,479,077 B2 * | 1/2009 | Markley | F16H 7/08 | 474/122 |
| 7,513,843 B2 * | 4/2009 | Markley | F16H 7/0848 | 474/140 |
| 7,537,533 B2 * | 5/2009 | Wigsten | F16H 7/08 | 474/111 |
| 7,628,719 B2 * | 12/2009 | Markley | F16H 7/0848 | 474/140 |
| 7,632,200 B2 * | 12/2009 | Markley | F16H 7/0848 | 474/140 |
| 8,052,558 B2 * | 11/2011 | Markley | F16H 7/0848 | 474/111 |
| 8,052,559 B2 * | 11/2011 | Wigsten | F16H 7/0831 | 474/111 |
| 8,066,600 B2 * | 11/2011 | Wigsten | F16H 7/0848 | 474/111 |
| 8,387,244 B2 * | 3/2013 | Markley | F16H 7/08 | 123/90.31 |
| 8,393,986 B2 * | 3/2013 | Young | F16H 7/20 | 474/101 |
| 8,454,462 B2 * | 6/2013 | Konno | F16H 7/08 | 474/140 |
| 8,465,385 B2 * | 6/2013 | Konno | F16H 7/08 | 474/140 |
| 8,523,720 B2 * | 9/2013 | Reinhart | F16H 7/0848 | 29/525.01 |
| 8,550,943 B2 * | 10/2013 | Kroon | F01L 1/02 | 474/111 |
| 8,579,746 B2 * | 11/2013 | Mori | F16H 7/08 | 474/140 |
| 8,608,601 B2 * | 12/2013 | Kim | F16H 7/08 | 474/111 |
| 8,672,785 B2 * | 3/2014 | Young | F16H 7/08 | 474/111 |
| 8,714,124 B2 * | 5/2014 | Koiwa | F02F 7/0073 | 123/90.38 |
| 8,876,642 B2 * | 11/2014 | Adams | F16H 7/18 | 474/140 |
| 9,080,640 B2 * | 7/2015 | Markley | F16H 7/08 | |
| 9,188,202 B2 * | 11/2015 | Markley | F16H 7/08 | |
| 9,206,886 B2 * | 12/2015 | Young | F16H 7/08 | |
| 10,253,867 B2 * | 4/2019 | Lee | F02B 67/06 | |
| 10,487,921 B2 * | 11/2019 | Voges | F02F 1/24 | |
| 10,738,862 B2 * | 8/2020 | Maeda | F16H 7/08 | |
| 11,732,785 B2 * | 8/2023 | Nyga | F16H 7/06 | 474/111 |
| 11,773,756 B2 * | 10/2023 | Takashiba | F01L 1/3442 | 123/90.15 |
| 11,933,400 B2 * | 3/2024 | Nyga | F02B 67/06 | |
| 11,940,047 B2 * | 3/2024 | Nyga | F01L 1/022 | |
| 12,117,079 B2 * | 10/2024 | Lim | F16H 57/05 | |
| 12,275,172 B2 * | 4/2025 | Clayton | B29C 45/1676 | |
| 2002/0045503 A1 * | 4/2002 | Young | F16H 7/18 | 474/140 |
| 2004/0005952 A1 * | 1/2004 | Bachmair | F01L 1/02 | 474/140 |
| 2004/0149250 A1 * | 8/2004 | Gschwindt | F01L 1/02 | 123/90.31 |
| 2005/0061284 A1 * | 3/2005 | Sato | F02B 75/06 | 123/192.2 |
| 2005/0085322 A1 * | 4/2005 | Markley | F16H 7/18 | 474/101 |
| 2005/0130776 A1 * | 6/2005 | Markley | F16H 7/24 | 474/140 |
| 2006/0247080 A1 * | 11/2006 | Wigsten | F16H 7/08 | 474/140 |
| 2006/0270502 A1 * | 11/2006 | Markley | F16H 7/08 | 474/140 |
| 2006/0293134 A1 * | 12/2006 | Markley | F16H 7/08 | 474/140 |
| 2007/0037646 A1 * | 2/2007 | Markley | F16H 7/18 | 474/140 |
| 2007/0066428 A1 * | 3/2007 | Tryphonos | F16H 7/0836 | 474/140 |
| 2007/0173362 A1 * | 7/2007 | Ullein | F16H 7/08 | 474/140 |
| 2009/0197724 A1 * | 8/2009 | Young | F16B 39/32 | 474/133 |
| 2009/0205206 A1 * | 8/2009 | Markley | F16H 7/08 | 474/140 |
| 2009/0275430 A1 * | 11/2009 | Markley | F16H 7/0848 | 474/111 |
| 2009/0275431 A1 * | 11/2009 | Wigsten | F16H 7/0848 | 474/111 |
| 2009/0325749 A1 * | 12/2009 | Wigsten | F16H 7/0831 | 474/111 |
| 2009/0325750 A1 * | 12/2009 | Wigsten | F16H 7/0831 | 474/111 |
| 2010/0248876 A1 * | 9/2010 | Kroon | F16H 7/18 | 474/111 |
| 2011/0003657 A1 * | 1/2011 | Reinhart | F16H 7/0848 | 29/525.01 |
| 2011/0015014 A1 * | 1/2011 | Kroon | F16H 7/08 | 474/111 |
| 2011/0105258 A1 * | 5/2011 | Konno | F16H 7/08 | 474/140 |
| 2011/0183797 A1 * | 7/2011 | Konno | F16H 7/08 | 474/111 |
| 2011/0201465 A1 * | 8/2011 | Kim | F16H 7/08 | 474/111 |
| 2011/0251002 A1 * | 10/2011 | Mori | F16H 7/06 | 474/140 |
| 2012/0015769 A1 * | 1/2012 | Adams | F16H 7/18 | 474/140 |
| 2012/0052997 A1 * | 3/2012 | Young | F16H 7/08 | 474/111 |

(56) References Cited

U.S. PATENT DOCUMENTS

| | | | |
|---|---|---|---|
| 2014/0162819 A1* | 6/2014 | Young | F16H 7/08 |
| | | | 474/111 |
| 2018/0231106 A1* | 8/2018 | Stiglmaier | F02B 67/06 |
| 2018/0291987 A1* | 10/2018 | Maeda | F16H 7/08 |
| 2018/0334928 A1* | 11/2018 | Yamauchi | F16H 7/08 |
| 2022/0228649 A1* | 7/2022 | Nyga | F16H 7/06 |
| 2022/0258388 A1* | 8/2022 | Clayton | B29C 45/0001 |
| 2023/0184311 A1* | 6/2023 | Nyga | F01L 1/022 |
| | | | 474/140 |
| 2023/0193795 A1* | 6/2023 | Nyga | F16H 7/18 |
| | | | 474/140 |
| 2023/0250741 A1* | 8/2023 | Takashiba | F01L 1/3442 |
| | | | 123/90.15 |
| 2023/0250742 A1* | 8/2023 | Takashiba | B62K 11/04 |
| | | | 180/229 |

* cited by examiner

90s

RIGHT SIDE SURFACE

FRONT SURFACE

LEFT SIDE SURFACE

LOWER SURFACE

FIG. 4

INTERNAL COMBUSTION ENGINE

CROSS-REFERENCE TO RELATED APPLICATION

This application claims priority to Japanese Patent Application No. 2024-010253 filed on Jan. 26, 2024, incorporated herein by reference in its entirety.

BACKGROUND

1. Technical Field

The present disclosure relates to an internal combustion engine.

2. Description of Related Art

Japanese Unexamined Patent Application Publication No. 8-156640 (JP 8-156640 A), for example, describes a feature in which power of a crankshaft of an internal combustion engine is distributed to two accessories and a camshaft via a single winding electric member (chain).

SUMMARY

According to the above-described configuration, however, the entire length of the chain is increased, and therefore it is necessary to increase the size of the internal combustion engine body accordingly. On the other hand, when a configuration in which power of a crankshaft is distributed to accessories, a camshaft, etc., via a plurality of chains is used, each chain is shortened. However, it is necessary to provide a fastening region for a chain guide and a chain tensioner for each chain in an internal combustion engine body so as not to interfere with each chain, still increasing the size.

The present disclosure has been made in view of the above issue, and an object thereof is to provide a small-sized internal combustion engine.

An aspect of the present disclosure provides an internal combustion engine including:

a plurality of chains that is wound around a crankshaft that projects from an internal combustion engine body and adjacent to each other in an axial direction, and to each of which power is distributed from the crankshaft;

a chain tensioner that applies tension to the chains;

a chain guide that guides the chains; and a bracket attached to the internal combustion engine body so as to straddle at least one of the chains, in which at least one of the chain tensioner and the chain guide is attached to the bracket.

In the above internal combustion engine, the bracket may have a bridge shape in which a set of end portions in a direction substantially orthogonal to the axial direction is bent, and be fastened to the internal combustion engine body at the end portions.

In the above internal combustion engine, at least one of the chain tensioner and the chain guide may be fastened to a coupling portion that couples the end portions.

In the above internal combustion engine, the internal combustion engine body may include a set of projecting portions to be fastened to the end portions of the bracket; and the at least one chain may pass between the projecting portions.

In the above internal combustion engine, at least one of the chain tensioner and the chain guide may be fastened to the projecting portions together with the end portions.

According to the present disclosure, it is possible to reduce the size of the internal combustion engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is an enlarged view of the periphery of the brackets; and

DETAILED DESCRIPTION OF EMBODIMENTS

Configuration of the Chain Mechanism

Figure 1:
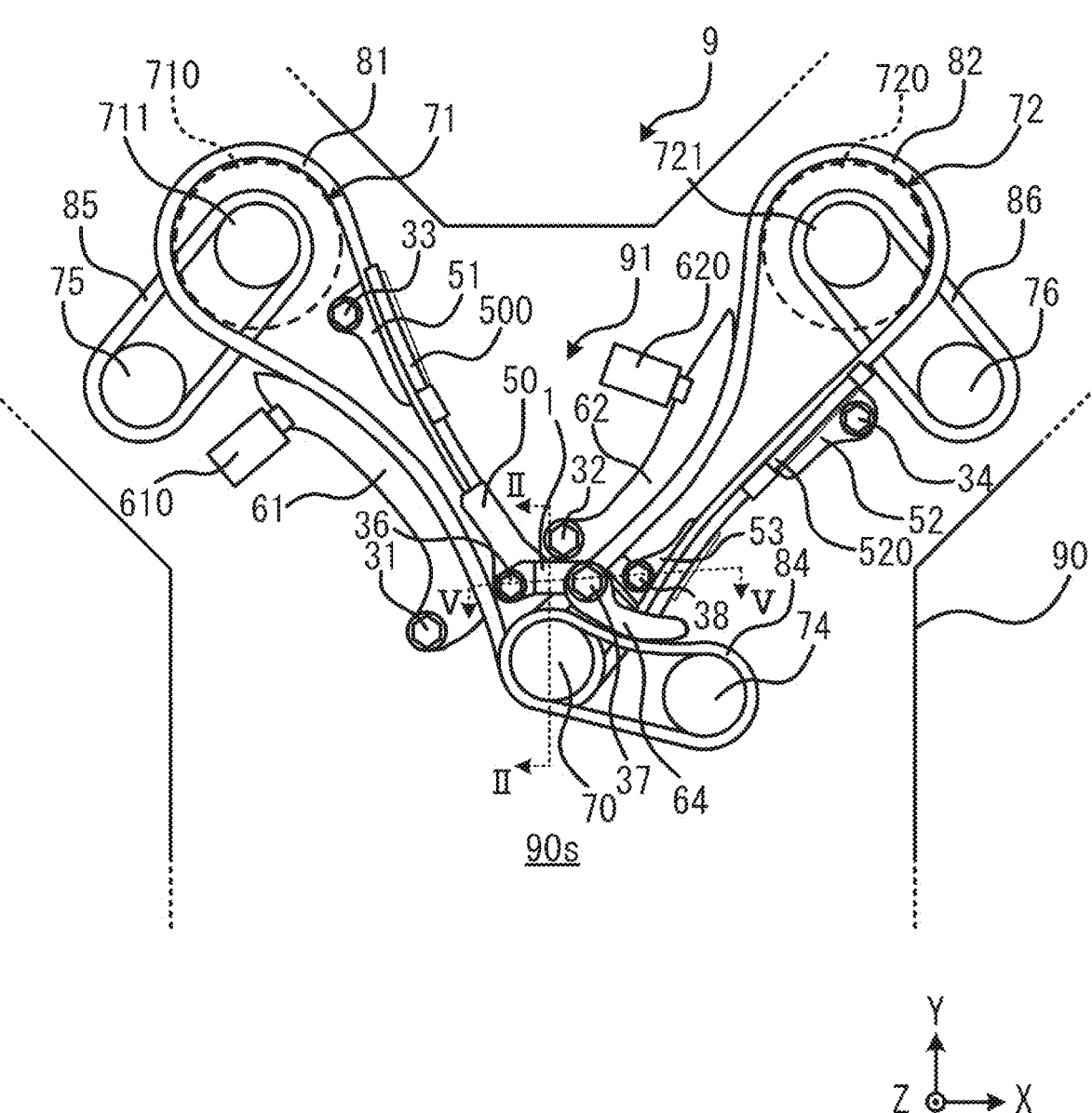
FIG. 1 is a plan view illustrating an example of a chain mechanism.

FIG. 1 is a plan view illustrating an example of a chain mechanism 91. The chain mechanism 91 is provided, for example, on a side surface 90s of the cylinder block 90, which is the main body of the engine 9. Here, the engine 9 is an example of an internal combustion engine, and the cylinder block 90 is an example of an internal combustion engine main body. The chain mechanism 91 of the present example is provided in the V-shaped engine 9, but is not limited thereto, and may be provided in another internal combustion engine.

In FIGS. 1 and 3 to 5, the X-axis, the Y-axis, and the Z-axis orthogonal to each other are shown. The X-axis and the Y-axis are directions substantially parallel to the side surface 90s, and the Z-axis is a direction substantially perpendicular to the side surface 90s.

The chain mechanism 91 includes a bracket 1, a plurality of chains 81, 82, 84 to 86, fixing guides 50 to 53, movable guides 61, 62, a chain tensioner 64, 610, 620, a crankshaft 70, and sprockets 71, 72, 74. The crankshaft 70 rotates when power is transmitted from a cylinder in the cylinder block 90. The power of the crankshaft 70 is distributed from each chain 81, 82, 84 to 86 by the following configuration.

Figure 2:
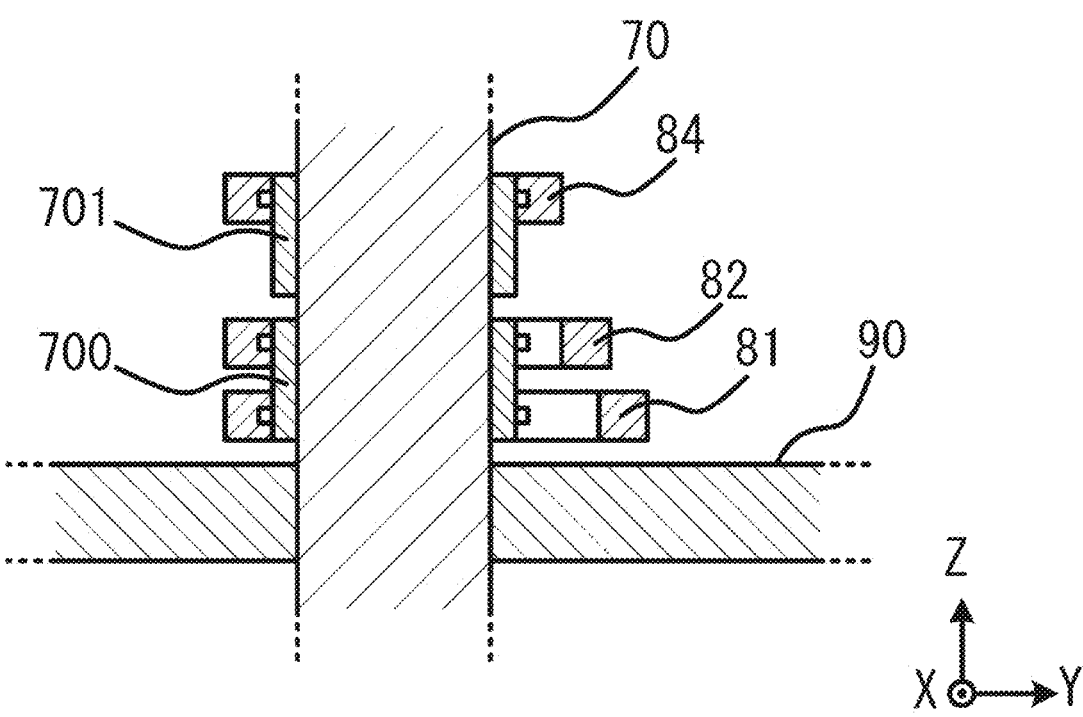
FIG. 2 is a cross-sectional view of the crankshaft taken along II-II of FIG. 1.

FIG. 2 is a cross-sectional view of the crankshaft 70 taken along II-II of FIG. 1. The axial direction of the crankshaft 70 coincides with the direction of the Z-axis. Chains 81 and 82 are hung around the circumferential surface of the crankshaft 70 via a sprocket 700, and chain 84 is hung around via a sprocket 701. The chains 81, 82, and 84 are wound around the crankshaft 70 so as to be adjacent to each other in the axial direction of the crankshaft 70 in this order.

Referring again to FIG. 1, the sprocket 71 is connected to, for example, an intake camshaft (not shown) on the light bank side of the engine 9, and has an integrated large-diameter gear 710 and a small-diameter gear 711. Incidentally, since the large-diameter gear 710 is positioned outward from the small-diameter gear 711 as viewed from the side surface 90s, it is indicated by a dotted line for convenience. The chain 81 extends from the crankshaft 70 to the light bank side of the engine 9 and is wound around the large-diameter gear 710. Accordingly, the sprocket 71 rotates in conjunction with the rotation of the crankshaft 70.

The sprocket 75 is disposed in the vicinity of the sprocket 71 in the light bank of the engine 9, and is connected to, for example, an exhaust camshaft (not shown). The chain 85 is hung around the small-diameter gear 711 and the sprocket 75 of the sprocket 71. Accordingly, the sprocket 75 rotates in conjunction with the rotation of the crankshaft 70.

The movable guide 61 is disposed between the crankshaft 70 and the sprocket 71 outside the region surrounded by the chain 81. The movable guide 61 extends from the vicinity of the crankshaft 70 toward the vicinity of the middle between the sprocket 71 and the sprocket 75, and is pressed against the chain 81. The rear end of the movable guide 61 is fastened by a bolt 31 so as to be rotatable with respect to the cylinder block 90.

The chain tensioner 610 is disposed near the distal end of the movable guide 61, and presses the distal end of the movable guide 61 by, for example, a spring mechanism. As a result, the movable guide 61 is biased toward the chain 81, and tension is generated in the chain 81.

The fixing guide 51 is disposed between the crankshaft 70 and the sprocket 71 in a region surrounded by the chain 81. The fixing guide 51 is a plate-shaped member having a substantially L-shaped cross section. The fixing guide 51 is fixed by the bolt 33 in the area surrounded by the chain 81, passes between the chain 81 and the side surface 90s, and extends to the outer side of the chain 81 and bends in the positive direction of the Z-axis. A guide rail 500 along the side surface of the chain 81 is held in the bent portion of the fixing guide 51. The guide rail 500 is held by a fixing guide 50 in the vicinity of the crankshaft 70 on the opposite side of the fixing guide 51.

The sprocket 72 is connected to, for example, an intake camshaft (not shown) on the left bank side of the engine 9, and includes an integrated large-diameter gear 720 and a small-diameter gear 721. Incidentally, since the large-diameter gear 720 is positioned outward from the small-diameter gear 721 as viewed from the side surface 90s, it is indicated by a dotted line for convenience. The chain 82 extends from the crankshaft 70 to the left bank side of the engine 9 and is wound around the large-diameter gear 720. Accordingly, the sprocket 72 rotates in conjunction with the rotation of the crankshaft 70.

The sprocket 76 is disposed in the vicinity of the sprocket 72 in the left bank of the engine 9, and is connected to, for example, an exhaust camshaft (not shown). The chain 86 is hung around the small-diameter gear 721 and the sprocket 76 of the sprocket 72. Accordingly, the sprocket 76 rotates in conjunction with the rotation of the crankshaft 70.

The movable guide 62 is disposed between the crankshaft 70 and the sprocket 72 outside the area surrounded by the chain 82. The movable guide 62 extends from the vicinity of the crankshaft 70 toward the vicinity of the sprocket 72 and is pressed against the chain 82. The rear end of the movable guide 62 is fastened by a bolt 32 so as to be rotatable with respect to the cylinder block 90.

The chain tensioner 620 is disposed near the distal end of the movable guide 62, and presses the distal end of the movable guide 62 by, for example, a spring mechanism. As a result, the movable guide 62 is biased toward the chain 82, and tension is generated in the chain 82.

The fixing guide 52 is arranged between the crankshaft 70 and the sprockets 72, 76 outside the area surrounded by the chain 82. The fixing guide 52 is a plate-shaped member having a substantially L-shaped cross section. The fixing guide 52 is fixed by the bolt 34 outside the region surrounded by the chain 82, and is bent in the positive direction of the Z-axis in front of the chain 82. A guide rail 520 along the side surface of the chain 82 is held in the bent portion of the fixing guide 52. The guide rail 520 is held on the opposite side of the fixing guide 52 by a fixing guide 53 in the vicinity of the crankshaft 70.

The sprocket 74 is disposed on the right side near the crankshaft 70. Chain 84 is wrapped around sprocket 74 and crankshaft 70. For example, the sprocket 74 is connected to an oil pump (not shown). Accordingly, the oil pump is driven in conjunction with the crankshaft 70.

The fixing guides 50 and 53 and the chain tensioner 64 are fixed to the cylinder block 90 together with the bracket 1 in the vicinity of the crankshaft 70.

The fixing guides 50 and 53 are examples of chain guides for guiding the chains 81 and 82, respectively. The fixing guide 50 is fastened to the cylinder block 90 by bolts 36 in the vicinity of the crankshaft 70 in the region surrounded by the chain 81. The fixing guide 50 is a plate-shaped member extending along the chain 81 between the crankshaft 70 and the other fixing guides 51, and has a substantially L-shaped cross section.

The fixing guide 50 covers the chain 81 from the outside of the cylinder block 90, extends to the outside of the region surrounded by the chain 81, and bends in the negative direction of the Z-axis. A guide rail 500 is held in a bent portion of the fixing guide 50.

The fixing guide 53 is fastened to the cylinder block 90 by a bolt 38 in the vicinity of the crankshaft 70 in the region surrounded by the chain 82. The fixing guide 53 is a plate-shaped member extending along the chain 82 between the crankshaft 70 and the other fixing guides 52, and has a substantially L-shaped cross section.

The fixing guide 53 passes between the chain 82 and the side surface 90s and extends to the outer side of the chain 82 and is bent in the positive direction of the Z-axis. A guide rail 520 is held in a bent portion of the fixing guide 53.

The chain tensioner 64 provides tension to the chain 84. The chain tensioner 64 is disposed in the vicinity of the crankshaft 70 and the sprocket 74 outside the region surrounded by the chain 84. One end of the chain tensioner 64 is fastened by a bolt 37 so as to be rotatable with respect to the cylinder block 90.

The chain tensioner 64 is biased so as to be pressed against the side surface of the chain 84 by a spring mechanism provided around the axis of the bolt 37, for example. This creates a tension in the chain 84.

The bracket 1 is attached to the cylinder block 90 so as to straddle the chains 81 and 82. Therefore, since the fixing guides 50 and 53 and the chain tensioner 64 can be provided without interfering with the chains 81 and 82, the required space for the chain mechanisms 91 can be reduced on the side surface 90s of the cylinder block 90.

Shape of the Bracket

Figure 3:
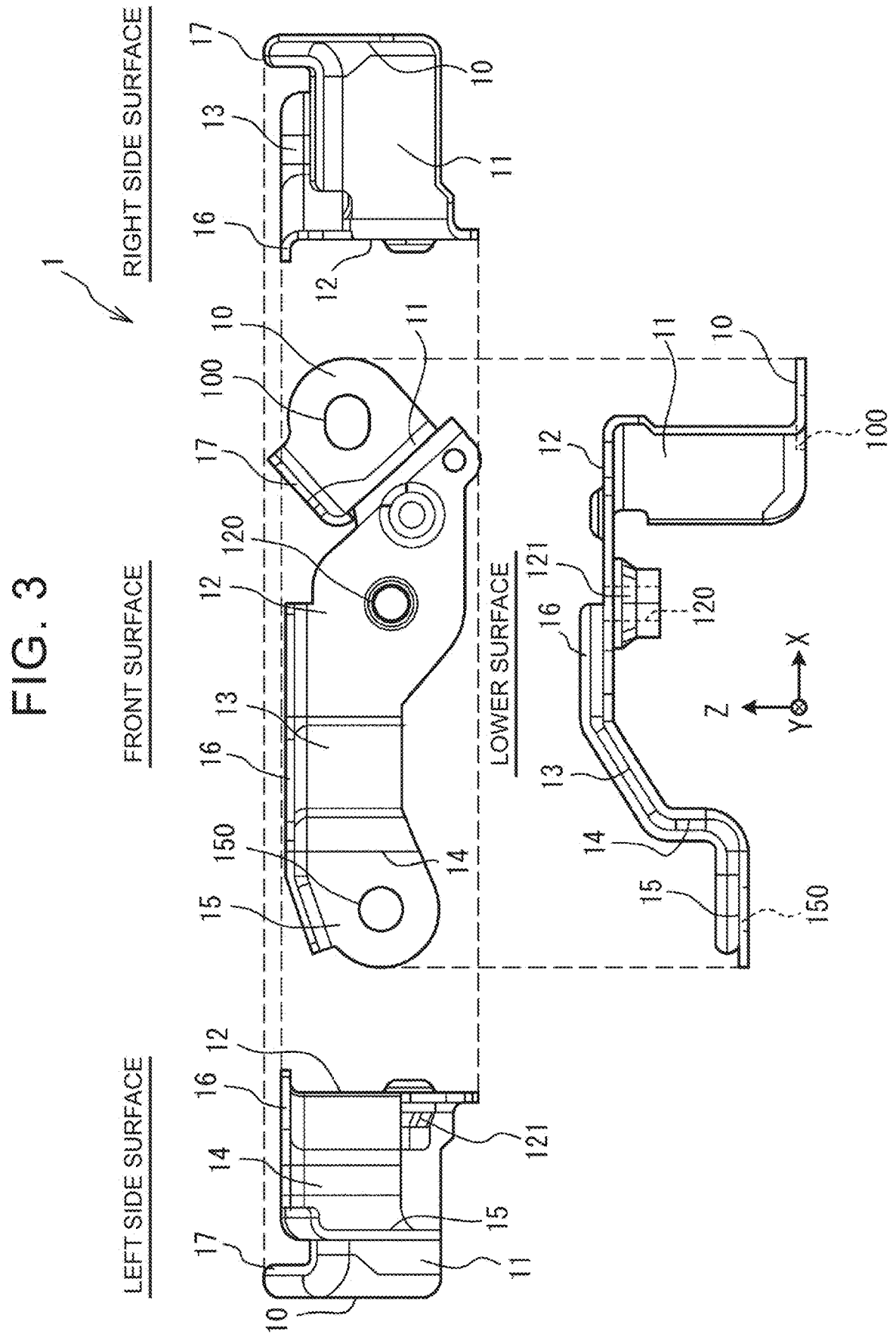
FIG. 3 is a plan view illustrating an example of a bracket.

FIG. 3 is a plan view illustrating an example of the bracket 1. FIG. 3 shows a front surface, a left side surface, a right side surface, and a lower surface of the bracket 1. The front surface of the bracket 1 represents the bracket 1 when the side surface 90s is viewed from the front. In FIG. 3, the X-axis, the Y-axis, and the Z-axis represent a coordinate system of the lower surface with respect to the bracket 1.

The bracket 1 is a metal plate-like member made of, for example, sheet metal. The bracket 1 includes plate-shaped fixing portions 10 and 15, bent portions 11 and 14, an inclined portion 13, and a central portion 12. The fixing portion 10, the bent portion 11, the central portion 12, the inclined portion 13, the bent portion 14, and the fixing portion 15 are adjacent to each other in this order in the X-axis direction.

The fixing portion 10 has a fastening hole 100 for the bolt 38 that fixes the fixing guide 53. The fastening hole 100 penetrates the plate surface of the fixing portion 10 in the Z-axis direction. The plate surface of the fixing portion 10 faces the side surface 90s. The bent portion 11 is bent substantially at right angles to the plate surface of the fixing portion 10.

The central portion 12 has a fastening hole 120 through which a bolt 37 for connecting the chain tensioner 64 is inserted. The fastening hole 120 penetrates a substantially bowl-shaped fastening portion 121 protruding downward (in the negative Z-axis direction) of the central portion 12 in the Z-axis direction. The central portion 12 is bent at a substantially right angle with respect to the bent portion 11 so as to face the side surface 90s.

The inclined portion 13 is inclined in the negative direction of the Z-axis at a predetermined angle with respect to the plate surface of the central portion 12. The bent portion 14 is bent at a predetermined angle with respect to the inclined portion 13 such that the plate surface thereof is substantially orthogonal to the plate surface of the central portion 12.

The fixing portion 15 has a fastening hole 150 for the bolt 36 for fixing the fixing guide 50. The fixing portion 15 is bent substantially at right angles to the bent portion 14 so as to face the side surface 90s. The plate surfaces of the two bent portions 11 and 14 are not parallel to each other, and the normal lines of the plate surfaces intersect each other at a predetermined angle.

As described above, the bracket 1 has a bridge shape in which a pair of end portions in the X-axis direction is bent. The fixing portions 10 and 15, the inclined portions 13, and the bent portions 11 and 14 are examples of a pair of end portions of the bracket 1 in a direction substantially orthogonal to the axial direction of the crankshaft 70. The central portion 12 is an example of a connecting portion that connects the inclined portion 13 and the bent portion 11.

Further, the central portion 12, the inclined portion 13, the bent portion 14, and the one end portion 16 of the fixing portion 15 are bent in the positive direction of the Z-axis. One end portion 17 of each of the fixing portion 10 and the bent portion 11 is also bent in the positive direction of the Z-axis. Thus, the strength of the bracket 1 is improved as compared with the case where there is no bending.

Positional Relationship Between the Bracket and Other Parts

Figure 4:
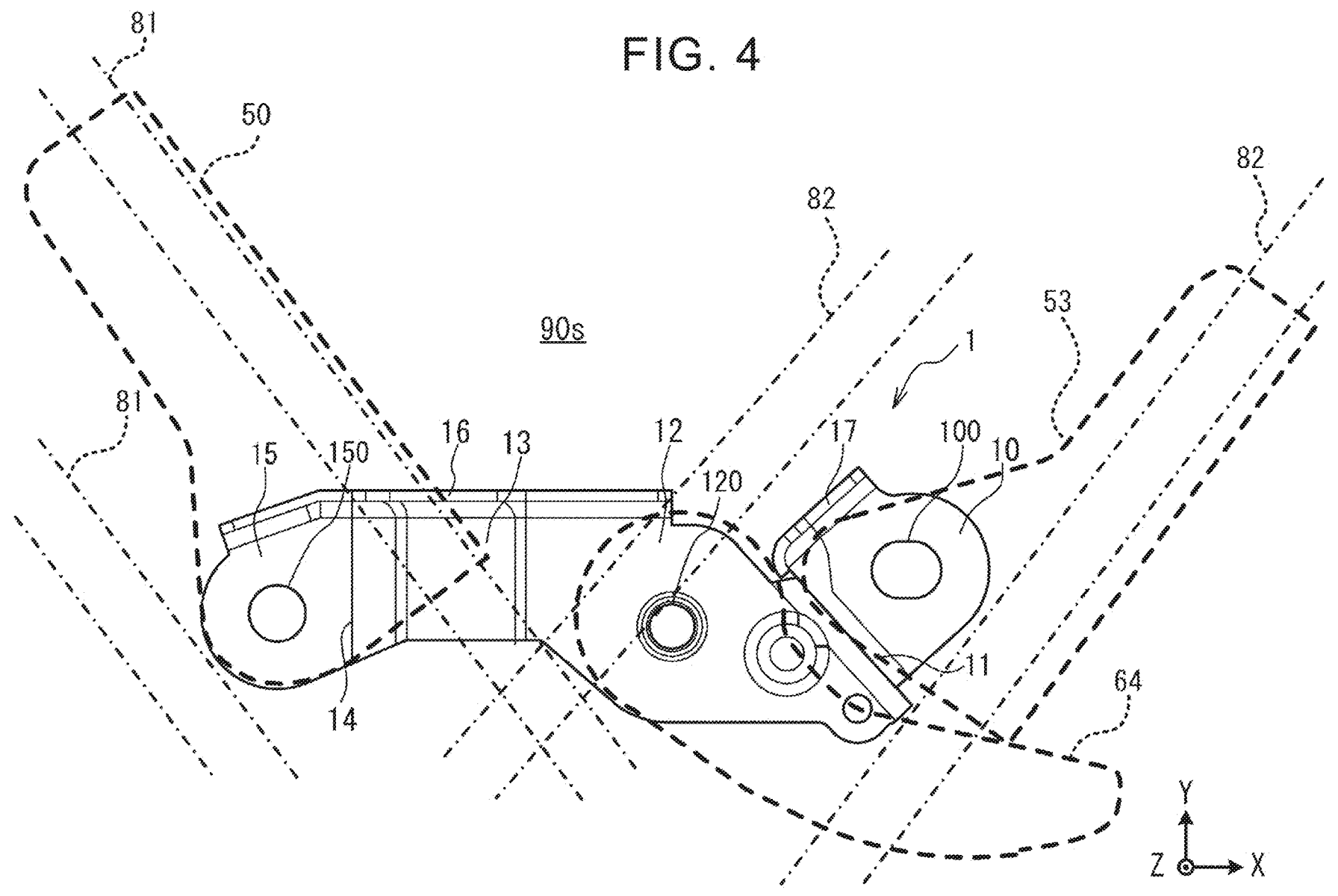
Figure 5:
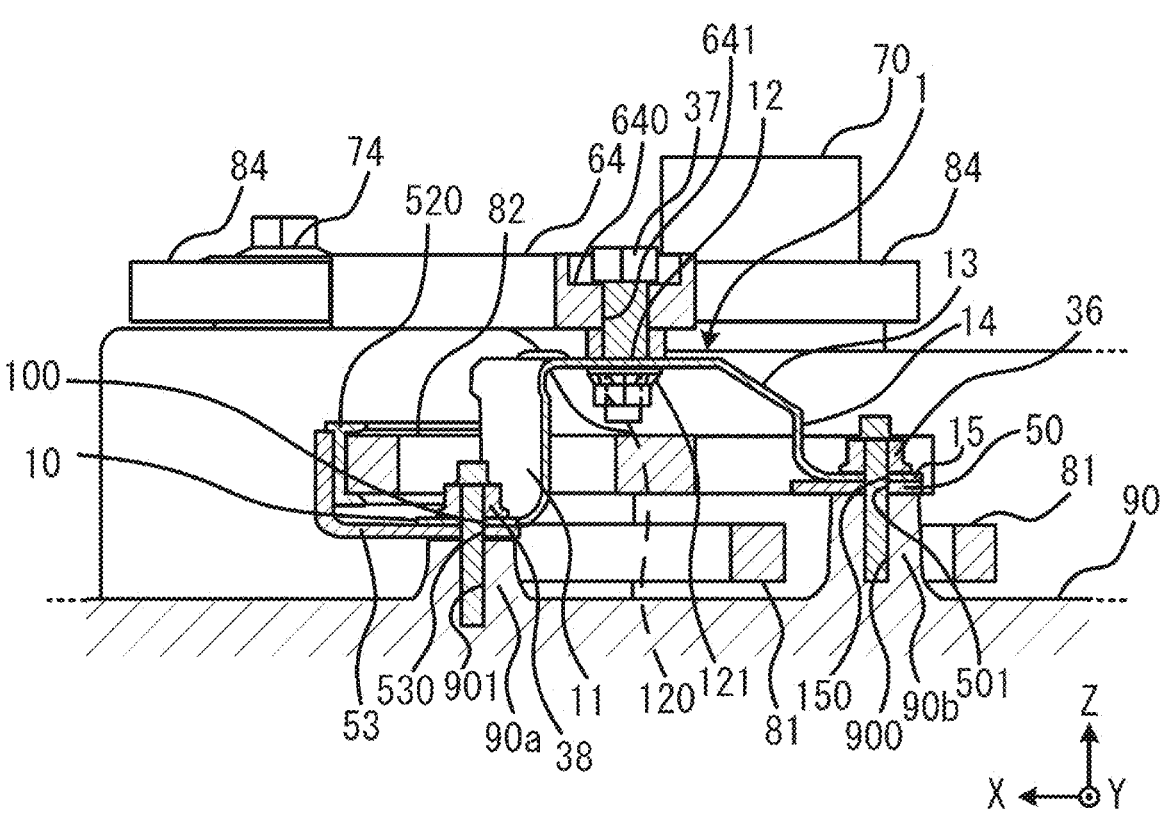
FIG. 5 is a cross-sectional view taken along V-V line of FIG. 1.

FIG. 4 is an enlarged view of the periphery of the brackets 1, and FIG. 5 is a cross-sectional view taken along B-B line of FIG. 1. In FIG. 4, the fixing guides 50 and 53 and the chain tensioner 64 are indicated by dotted lines, and the chains 81 and 82 are indicated by dashed-dotted lines. In FIG. 4 and FIG. 5, the same components as those in FIG. 1 and FIG. 3 are denoted by the same reference numerals, and the description thereof will be omitted.

The fixing portions 10 and 15 at both ends of the brackets 1 are fastened to a pair of projecting portions 90a, 90b on the side surface 90s by bolts 38 and 36, respectively. The projecting portion 90a, 90b protrudes from the side surface 90s in the positive direction of the Z-axis, and has fastening holes 901, 900 of the bolts 38 and 36. As described above, the bracket 1 has a bridge shape in which both ends are bent, and is fastened to the cylinder block 90 in the pair of fixing portions 10 and 15. Therefore, it is possible to secure a space for passing the chain 82 between the pair of fixing portions 10 and 15. In addition, since the brackets 1 are bridge-shaped, the central portion 12 can be separated from the side surface 90s of the fixing portions 10 and 15.

A chain tensioner 64 is attached to the central portion 12. A recessed portion 640 that is open to the outside of the cylinder block 90 (in the positive direction of the Z-axis) is provided at a root portion serving as a center of rotation of the chain tensioner 64. A fastening hole 641 of the bolt 37 is formed in the bottom portion of the recessed portion 640. The bolt 37 is screwed into the fastening hole 641 and the fastening hole 120 of the central portion 12. Thus, the chain tensioner 64 is attached to the central portion 12. Thus, the chain tensioner 64 can apply tension to the chain 84 located outside the central portion 12.

Further, when the side surface 90s is viewed from the front, the projecting portion 90a is located in the region surrounded by the chain 82 and outside the region surrounded by the chain 81. The projecting portion 90b is located in the region surrounded by the chain 81 and outside the region surrounded by the chain 82. With this arrangement, the bracket 1 is provided so as to straddle the chains 81 and 82.

The chain 82 passes through the lower portion of the central portion 12 between the bent portion 11 and the fixing portion 15 of the bracket 1. In addition, the chain 81 passes through the lower portion of the central portion 12 and the inclined portion 13 between the projecting portions 90a, 90b. Therefore, the height of the brackets 1 (the distance from the side surface 90s) can be suppressed to straddle the chain 81.

The fixing guide 53 is fastened to the projecting portion 90a together with the fixing portion 10 of the bracket 1 by the bolt 38, and the fixing guide 50 is fastened to the projecting portion 90b together with the fixing portion 15 of the bracket 1 by the bolt 36. The bolt 38 passes through the fastening hole 100 of the fixing portion 10 and the fastening hole 530 of the fixing guide 53 in this order and is fixed to the projecting portion 90a. The bolt 36 passes through the fastening hole 150 of the fixing portion 15 and the fastening hole 501 of the fixing guide 50 in this order and is fixed to the projecting portion 90b.

As described above, the fixing guides 50 and 53 are fastened to the projecting portion 90a, 90b together with the fixing portions 10 and 15 of the brackets 1. Therefore, in the side surface 90s, the fastening spaces of the fixing guides 50 and 53 and the fixing portions 10 and 15 can be saved.

As described above, the bracket 1 is attached to the cylinder block 90 so as to straddle the chains 81 and 82, and the chain tensioner 64 and the fixing guides 50 and 53 are attached to the bracket 1. Therefore, the chain tensioner 64 and the fixing guides 50 and 53 can be fixed on the cylinder block 90 without interfering with the chains 81 and 82. As a result, the space for fastening the chain tensioner 64 and the fixing guides 50 and 53 on the side surface 90s of the cylinder block 90 is reduced, so that the size of the engine 9 can be reduced.

In the present example, the chain tensioner 64 is attached to the central portion 12 of the bracket 1, and the fixing guides 50 and 53 are attached to the fixing portions 10 and 15 of the bracket 1, respectively, but the present disclosure is not limited thereto. For example, the fixing guide 50 may be attached to the central portion 12, or the chain tensioner 64 may be attached to the fixing portion 10, and the attachment form thereof is determined depending on the design of the chain mechanism 91. The bracket 1 straddles only the chains 81 and 82, but may straddle other chains 84 wound around the crankshaft 70 according to the design of the chain mechanism 91.

The above-described embodiments are preferred embodiments of the present disclosure. However, the present disclosure is not limited thereto, and various modifications can be made without departing from the gist of the present disclosure.

What is claimed is:

1. An internal combustion engine comprising:
   a cylinder block;
   a first sprocket operatively connected to an intake camshaft, the intake camshaft being provided on a right bank of the internal combustion engine;
   a second sprocket operatively connected to an exhaust camshaft, the exhaust camshaft being provided on a left bank of the internal combustion engine;
   a third sprocket operatively connected to an oil pump;
   a crankshaft that projects from the cylinder block;
   a first chain wound around the first sprocket and the crankshaft;
   a second chain wound around the second sprocket and the crankshaft;
   a third chain wound around the third sprocket and the crankshaft;
   a first chain guide configured to guide the first chain;
   a second chain guide configured to guide the second chain;
   a chain tensioner configured to apply tension to the third chain;
   and
   a bracket including a first end portion and a second end portion that are disposed in a direction substantially orthogonal to an axial direction of the crankshaft, and a connecting portion that couples the first end portion and the second end portion, wherein the bracket is fastened at the first end portion and the second end portion to the cylinder block,
the second end portion is parallel to the first end portion,
the connecting portion is spaced apart from the cylinder block,
the first chain guide is fastened to the first end portion and the second chain guide is fastened to the second end portion, and
the chain tensioner is fastened to a surface of the connecting portion that is parallel to the first end portion and faces away from the cylinder block.

2. The internal combustion engine according to claim 1, wherein:
   the cylinder block includes a set of projecting portions to be fastened to the end portions of the bracket; and
   at least one of the first chain and the second chain passes between the projecting portions.

3. The internal combustion engine according to claim 2, wherein
   the first chain guide is fastened to one of the projecting portions together with the first end portion, and
   the second chain guide is fastened to the other of the projecting portions together with the second end portion.

4. The internal combustion engine according to claim 1, wherein the first chain and the second chain pass through a clearance between the connecting portion and the cylinder block.

5. The internal combustion engine according to claim 1, wherein
   the first end portion is located outside a first region surrounded by the first chain and located in a second region surrounded by the second chain, and
   the second end portion is located outside the second region surrounded by the second chain and located in the first region surrounded by the first chain.

* * * * *